US00RE36672E

United States Patent [19]

Onooka et al.

[11] E Patent Number: Re. 36,672

[45] Reissued Date of Patent: Apr. 25, 2000

[54] READ/WRITE HEAD RETRACT MECHANISM

[75] Inventors: Yasushi Onooka; Junji Kawada, both of Chigasaki; Tetsu Yamamoto, Kawachinagano, all of Japan

[73] Assignee: Mitsubishi Denki Kabushiki Kaisha, Tokyo, Japan

[21] Appl. No.: 08/804,961

[22] Filed: Feb. 24, 1997

Related U.S. Patent Documents

Reissue of:

[64] Patent No.: 5,189,575
Issued: Feb. 23, 1993
Appl. No.: 07/592,585
Filed: Oct. 4, 1990

[30] Foreign Application Priority Data

Oct. 6, 1989 [JP] Japan ..... 1-262353

[51] Int. Cl.[7] ..... G11B 5/54; G11B 5/41

[52] U.S. Cl. ..... 360/105; 360/128

[58] Field of Search ..... 360/105, 128

[56] References Cited

U.S. PATENT DOCUMENTS

| | | | |
|---|---|---|---|
| 3,984,873 | 10/1976 | Pejcha | 360/105 |
| 4,644,429 | 2/1987 | Boe | 360/105 |
| 4,870,703 | 9/1989 | Augeri et al. | 360/105 |
| 4,933,785 | 6/1990 | Morehouse et al. | 360/105 |
| 5,027,241 | 6/1991 | Hatch et al. | 360/105 |
| 5,034,837 | 7/1991 | Schmitz | 360/105 |

FOREIGN PATENT DOCUMENTS

| | | |
|---|---|---|
| 58-147817 | 9/1983 | Japan . |
| 62-088124 | 4/1987 | Japan . |
| 2000893 | 1/1979 | United Kingdom . |
| 2187031 | 8/1987 | United Kingdom . |
| WO85/02483 | 6/1985 | WIPO . |
| WO89/08313 | 9/1989 | WIPO . |

OTHER PUBLICATIONS

Nikkei Electronics No. 391, Mar. 24, 1986, pp 96–99.

International Publication No. WO89/08313 entitled "Disk Drive Apparatus".

*Primary Examiner*—Craig A. Renner

*Attorney, Agent, or Firm*—Sughrue, Mion, Zinn, Macpeak & Seas, PLLC

[57] ABSTRACT

A retract mechanism for a magnetic head which can read from and/or write to a disk, the mechanism includes a spring arm which supports the head and urges the head toward the disk. The spring arm includes a cam follower which rides along the surface of the cam, which has two parallel horizontal surfaces and two incline surfaces. The spring arm is moved by an actuator in a radial direction along the disk. When the spring arm is moved radially away from the center of the disk, the cam urges the spring arm upwardly, thereby lifting the head up and away from the disk. As the spring arm continues to move radially away from the center of the disk, the cam guides the spring arm such that the head rests safely on a landing platform.

2 Claims, 9 Drawing Sheets

READ/WRITE HEAD RETRACT MECHANISM

Matter enclosed in heavy brackets [ ] appears in the original patent but forms no part of this reissue specification; matter printed in italics indicates the additions made by reissue.

*The present application is a parent application of a continuation application (U.S. application Ser. No. 09/418,041) filed on Oct. 13, 1999.*

BACKGROUND OF THE INVENTION

1. Field of the Invention

This invention relates to a disk drive apparatus which drives a disk-like recording medium, particularly to a head retract mechanism which retracts a read and/or write head from the recording medium at non-operating time.

2. Description of Related Art

FIG. 1 is a perspective view showing an example of a conventional disk driving apparatus having a head retract mechanism disclosed in PCT Publication No. WO 89/08313, filing date Feb. 27, 1989, FIG. 2 is a perspective view showing a detailed structure of the head retract mechanism. In the figures, reference numeral 3 is a read and/or write head for reading and/or writing a magnetic disk 1 which is rotatably driven by a spindle motor 2, the read and/or write head 3 comprising of a slider 4 and a coil 41 fixed at one side of the slider 4. The slider 4 is attached to the tip of a tapered flat spring 5 with a gimbal spring, being supported by the flat spring 5 so that it is energized towards the magnetic disk 1. In the middle of the spring 5, a cam follower 51 is set, which engages with a latch groove 91 of a ramp-type cam 9 to be described later is set. The base tip of the flat spring 5 is attached to an actuator 6 which rotates around a pivot shaft 61. The actuator 6 is in the form of an arm, on the tip of which is attached flat spring 5. The actuator 6 moves the read and/or write head 3 on the magnetic disk 1 to the loading direction shown by an arrow 12 and to the retracting direction (unloading direction) shown by an arrow 13. The spindle motor 2, actuator 6 and the cam 9 are attached to a base 10. The cam 9 is attached to base 10 along the radial direction of the magnetic disk 1 so that it engages with the cam follower 51 of the flat spring 6. The cam 9 has a section which surrounds the outer edge of the magnetic disk 1, and has a ramp and a latch groove 91 formed on the upper and lower sides of the cam 9 for latching the cam follower 51.

Next, explanation will be given on loading/retracting operation of a conventional disk driving apparatus constructed in such a way. FIG. 3 is an enlarged sectional view explaining the conventional loading/retracting operation.

In FIG. 3, when the power source is turned off, the cam follower 51 coupled with the spring 5 of the read and/or write head 3 rides on the cam 9 and is held at the latch groove 91, and the slider 4 detaches from the magnetic disk 1, but when the power source is turned on, the spindle motor 2 is driven to rotate the magnetic disk 1 supported by the spindle motor 2. Next, when the actuator 6 is driven to the loading direction 12, the cam follower 51 coupled with the spring 5 of the read and/or write head 3 rides across the latch groove 91 further to slide down the cam 9, the slider 4 being loaded on the magnetic disk 1. When the power source is turned off again, by using electric power stored in a capacitor or the like not shown in the figure, for example, the magnetic head 3 is driven to the retracting (unloading) direction 13 by the actuator 6, the cam follower 51 connected with the spring 5 being stranded on the cam 9 and the slider 4 being hung down in the air. It stops when it reaches the latch groove 91. The operation of the slider 4 at this time is shown by a motion line shown by an arrow 15.

FIG. 4 is a perspective view showing a construction of a disk driving apparatus of a conventional contact start stop method (CSS) which does not load/unload the read and/or write head 3 but starts/stops the spindle motor 2 in the state of remaining contacted with the magnetic disk 1. In the CSS method, the retract mechanism is not provided, and the read and/or write head 3 is made to be static at a time of non operation on a shipping zone provided at the innermost circumference of the magnetic disk 1. At an activation time of the magnetic disk apparatus of the CSS method, the spindle motor 2 is rotated with the slider 4 of the read and/or write head 3 being made to be static on the magnetic disk 1. Generally, the slider 4 is made to be static at the shipping zone to the inner circumference side of the magnetic disk 1. Although, at the beginning, the slider 4 rubs the magnetic disk 1, when the number of rotations exceeds the prescribed number, the slider 4 begins to rise on the magnetic disk 1 due to the air bearing effect. When the spindle motor 2 rotates regularly, it rises above the disk about 0.2 $\mu$m. In addition, at a stopping time of the magnetic disk apparatus, the slider 4 begins to touch the magnetic disk 1 when the number of rotations of the spindle motor 2 reduces from the regular number to a certain number, the slider 4 continuing to be rubbed with the magnetic disk 1 until the spindle motor 2 is stopped. Accordingly, a device which positively stops the spindle motor 2 is being developed.

In a conventional magnetic disk apparatus having a retract mechanism, when the power source is turned off, as it is in the retract state and the slider of the magnetic head floats in the air, there has been a problem that, in the case where vibration and shock are added from the exterior, stress is added to the flexible and thin gimbal spring of coupling part of the slider and the spring and the read and/or write head is easy to be destroyed.

On the other hand, the CSS method has a problem that, the less the height the slider rises from the magnetic disk becomes, the less the number it can CSS, that is, the expected life span, becomes. The more the recording density becomes high, the less the height needs to be. Accordingly, the distance in which the slider rubs the disk is elongated that much to enlarge aforesaid problem.

In addition, as the slider touches directly to the disk, there has been a limit upon withstanding vibration and shock at the time of non operation. Moreover in the case where the slider does not rise above the disk for some reason, there has been a danger that all of the data having been recorded on the magnetic disk may be destroyed. Furthermore, when the contact resistance of the slider and the disk increases resulting from the fact that the number of disks as being the recording medium increases due to high capacity, the spindle motor having big activating torque that much has been required. In addition, in this method, as it is not possible to rotate the spindle motor in the opposite direction of rotation to the regular one at the time of activation, an angle position detecting means accurate to a certain extent has been required in the driving circuit of the spindle motor. Moreover, means for reducing coast time of the spindle motor at the stopping time has been also required.

SUMMARY OF THE INVENTION

The present invention has been devised in consideration of the circumstances. The primary object of the present invention is to provide a highly reliable disk driving apparatus to which stress is not added at the coupling part of the slider and the spring and whose read and/or write head is hard to be destroyed even in the case where stress is added from the exterior by making the slider of the read and/or write head retract from the magnetic disk and ride on the landing plate, at the time of retract (off time of the power source).

Another object of the present invention is to provide a disk driving apparatus which is capable of cleaning the slider to lengthen the life of the apparatus by making the landing plate to be in the form of a brush.

In order to attain these objects, the disk driving apparatus related to the present invention is provided with a supporting means for receiving directly and supporting the read and/or write head itself after the read and/or write head detaches from the recording disk according to the cam at the time of retract (off time of the power source).

The retract mechanism of the read and/or write head of the invention comprises of the cam and the landing plate. The cam has the shape along which the spring of the read and/or write head is raised up and brought down. Although, according to the rising and falling of the spring, the read and/or write head is raised and brought down, the read and/or write head is to be supported independently from the spring by arranging the landing plate so that the read and/or write head contacts with it before retracting is over.

The above and further objects and features of the invention will more fully be apparent from the following detailed description with accompanying drawings.

DESCRIPTION OF THE PREFERRED EMBODIMENTS

In the following, explanation will be given on the invention referring to drawings showing the embodiments thereof.

Figure 1:
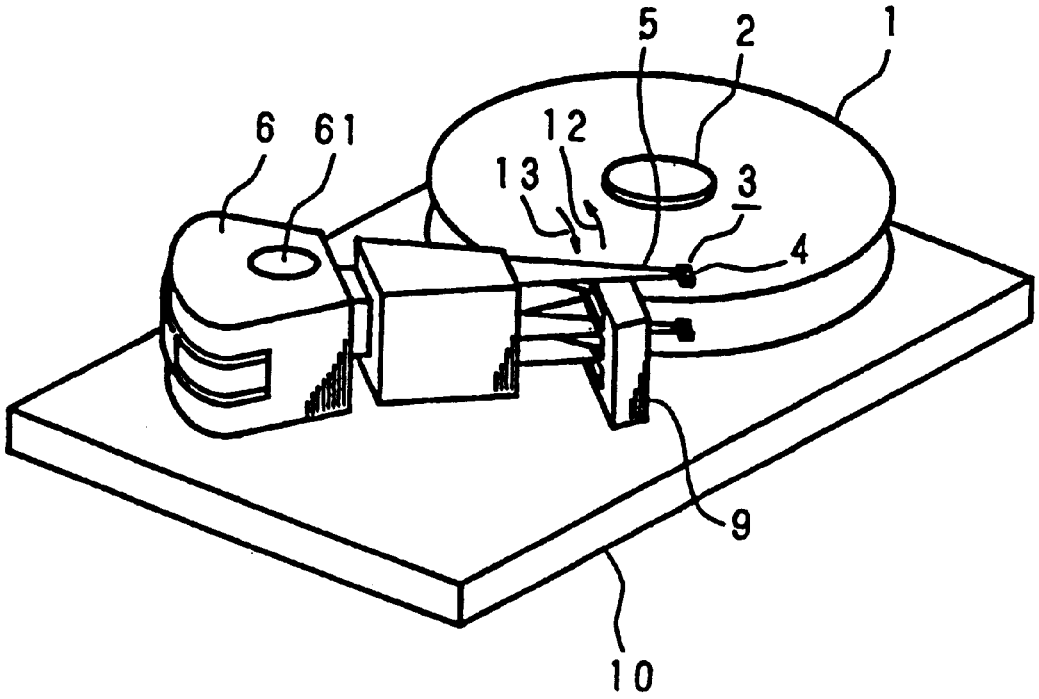
Fig. 1 Prior Art
FIG. 1 is a perspective view showing a whole construction of a conventional magnetic disk apparatus.
Figure 2:
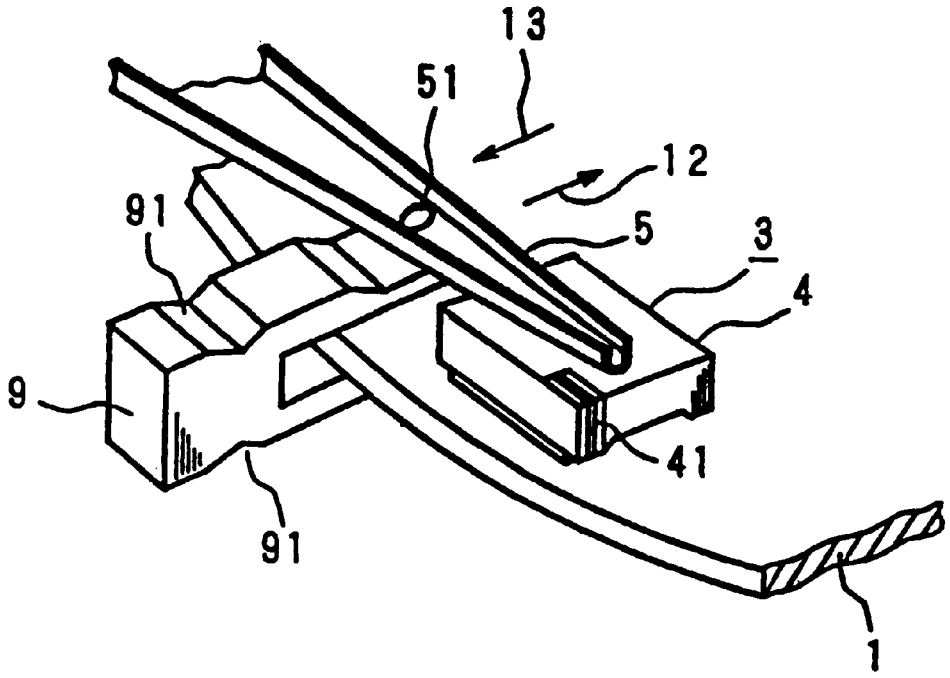
Fig. 2 Prior Art
FIG. 2 is a perspective view showing a conventional retract mechanism.
Figure 3:
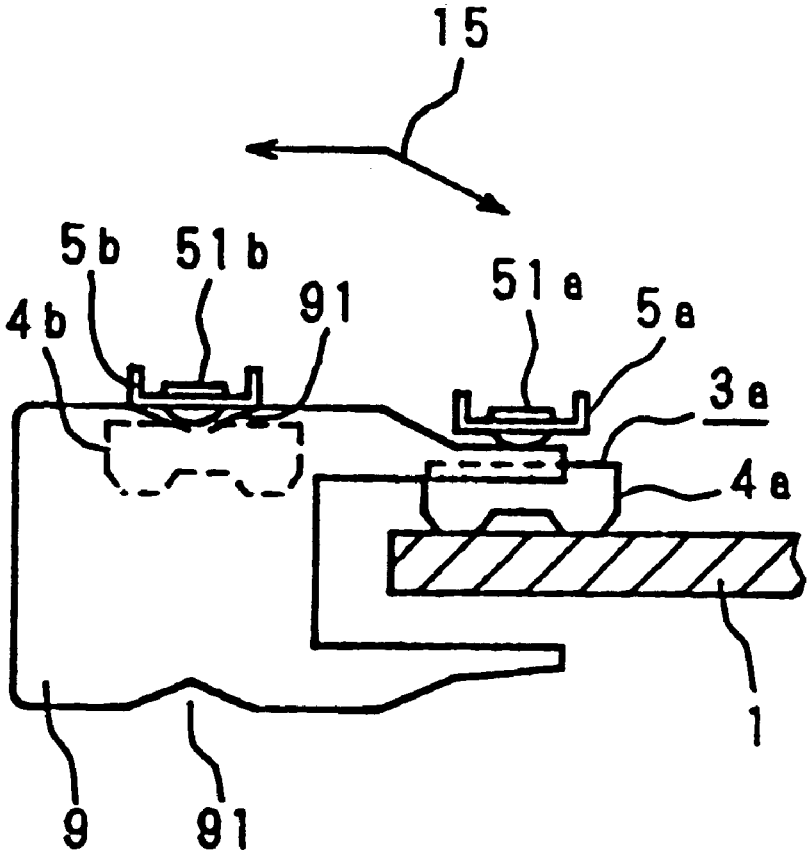
Fig. 3 Prior Art
FIG. 3 is a view showing the operation of the conventional retract mechanism.
Figure 4:
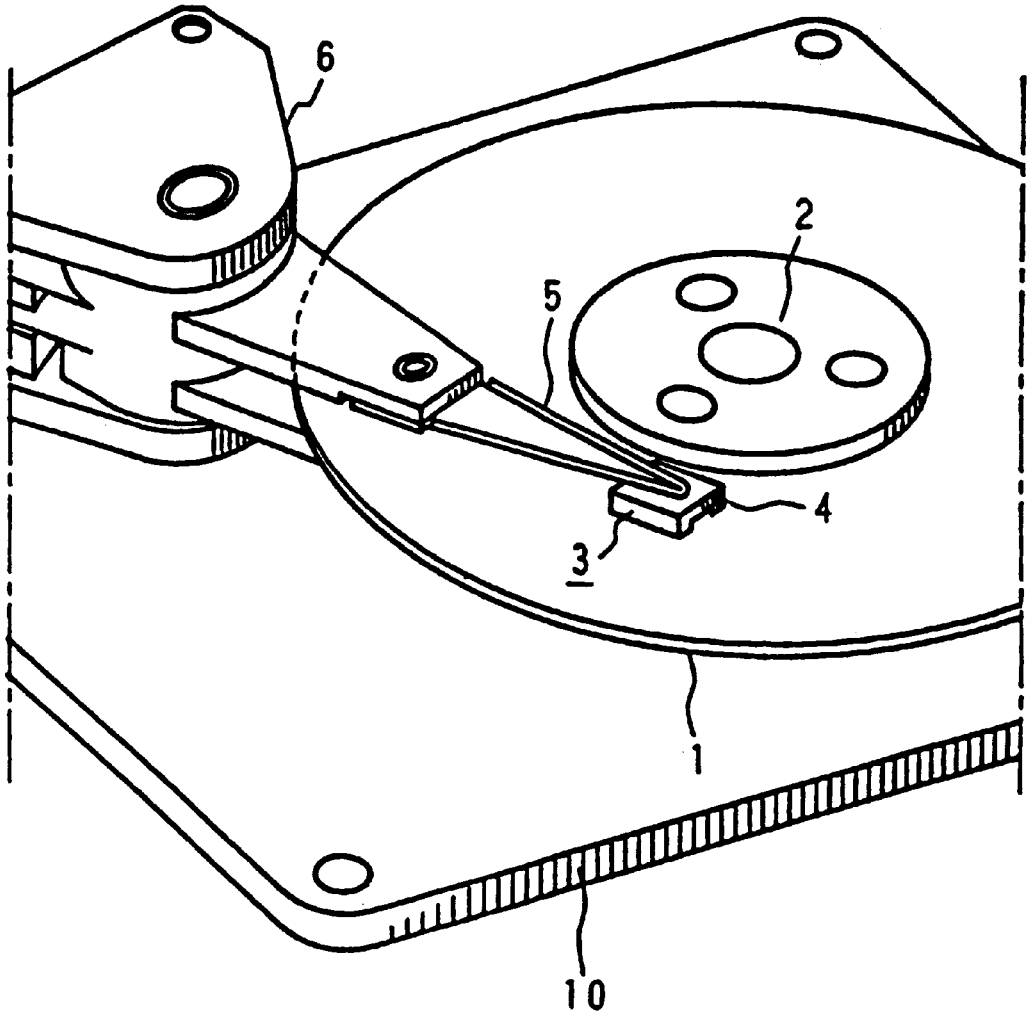
Fig. 4 Prior Art
FIG. 4 is a perspective view showing a conventional magnetic disk apparatus of CSS method.
Figure 5:
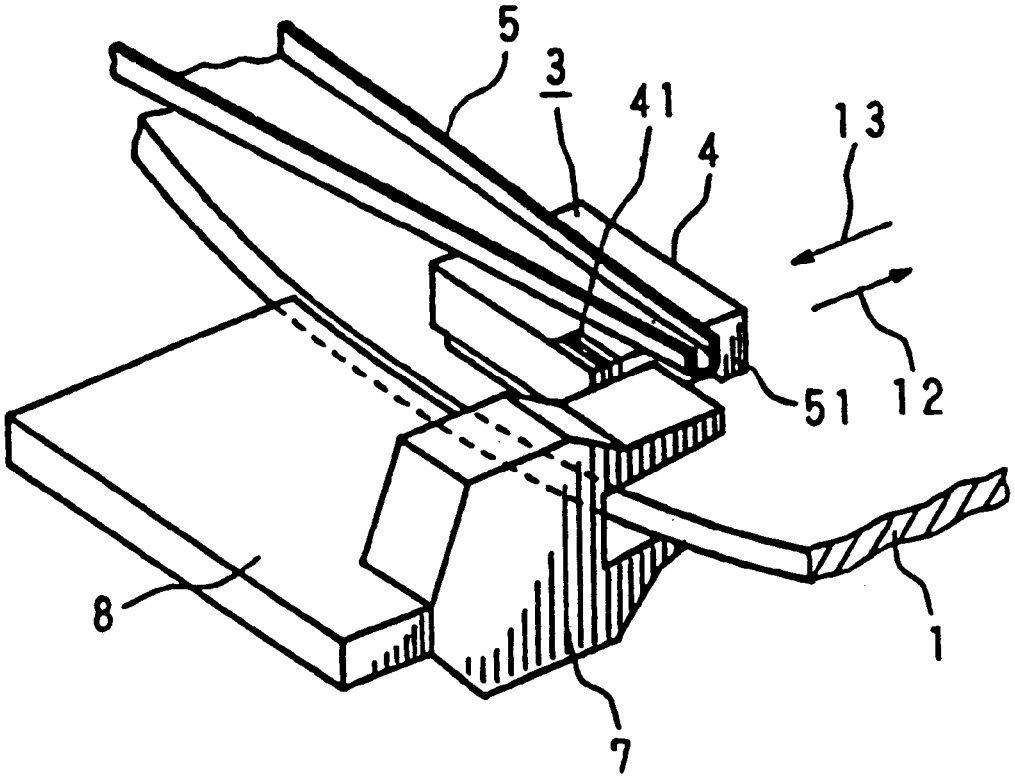
FIG. 5 is a perspective view showing an embodiment of the invention.

In FIG. 5, reference number 3 is a read and/or write head for reading and/or writing a magnetic disk 1 which is rotatably driven by a spindle motor, the read and/or write head 3 comprising a slider 4 and a coil 41 fixed at one side of the slider 4. The slider 4 is attached to the tip of a tapered flat spring 5 through a gimbal spring, being supported by the flat spring 5 so that it is energized towards the magnetic disk 1. At the tip of the spring 5, a U-shaped cam follower 51 engaging with a ramp type cam 7 to be described later is formed. The base tip of the flat spring 5 is attached to an actuator 6 which rotates around a pivot shaft 61, as in the prior art of FIG. 1. The actuator 6 is in the form of an arm, on the tip of which is attached the flat spring 5, and moves the read and/or write head 3 on the magnetic disk 1 to the loading direction shown by an arrow 12 and to the retracting direction (unloading direction) shown by an arrow 13. The cam 7 is directed along the radial direction of the magnetic disk 1 so that the cam follower 51 moves on its profile. The cam 7 surrounds the outer edge of the magnetic disk 1, the upper and lower sides of which have two ramps each of whose thickness increases and decreases gradually and a flat section which connects these ramps. At the side surface of the slider 4 side of the cam 7, a landing plate 8 for landing the slider 4 is integrally formed. The other construction is the same as in FIG. 1.

Now, the loading/unloading operation of the disk driving apparatus for the invention constructed in the above described manner will be explained.

Figure 6:
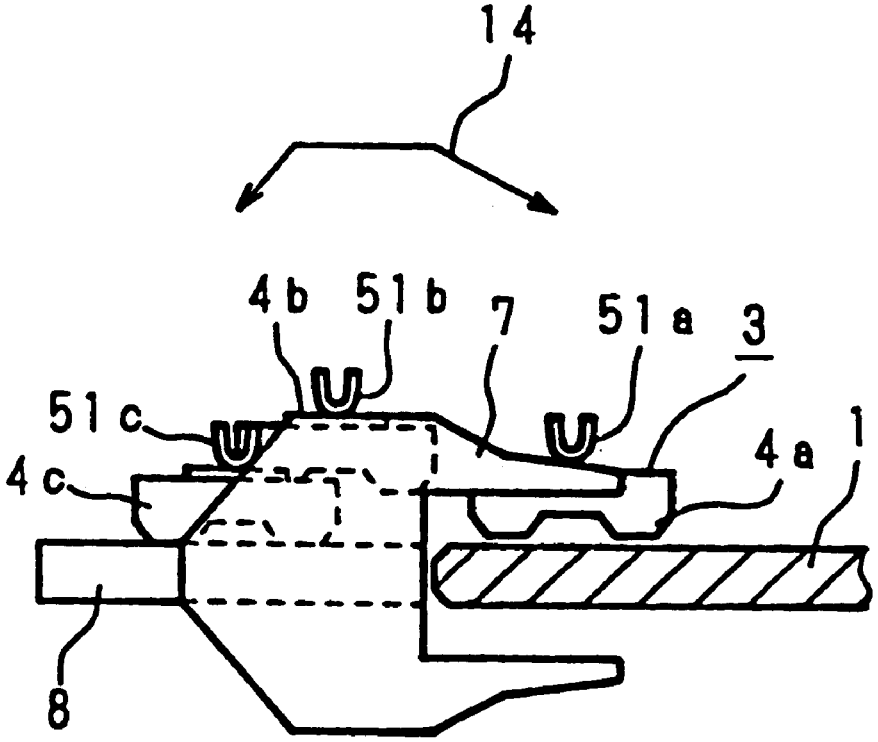
FIG. 6 and FIGS. 7*a–c* are views showing the condition of the operation.
Figure 7:
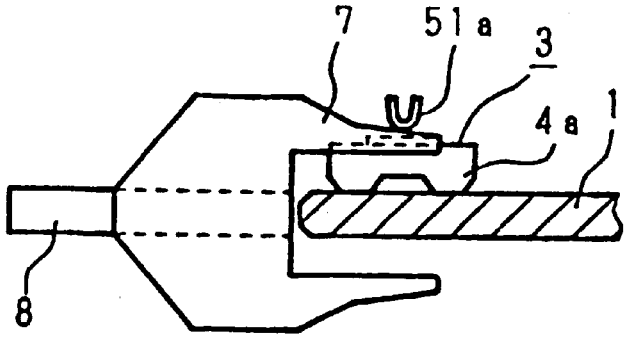
Figure 7:
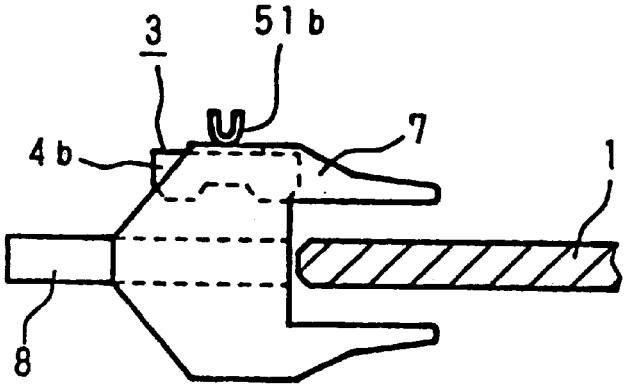
Figure 7:
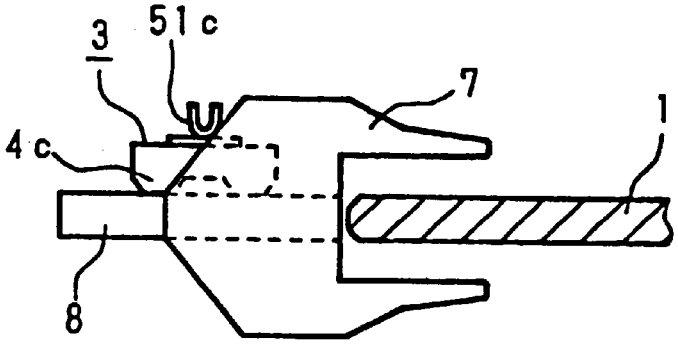

FIG. 6 and FIG. 7 are enlarged sectional views of the embodiment shown in FIG. 5 explaining the loading/unloading operation. In these figures, subscripts a, b and c show the positions of the slider 4 and the cam follower 51 at the time of loading, when cam follower 51 reaches its maximum displacement due to cam 7, and the time of retracting (unloading) respectively.

As shown in FIG. 5, at the time of normal operation after the power source is on, the slider 4 of the magnetic head 3 rises above the magnetic disk 1. The relation between the read and/or write head 3 and the cam 7 at this time is shown by the slider 4*a* and the cam follower 51*a* shown in FIG. 6 and FIG. 7(*a*). After this, when the power source is turned off, the read and/or write head 3 is driven by the actuator 6 to the unloading direction shown in FIG. 5, the cam follower 51 being raised up along the cam 7. At this time, the slider 4 is separated from the magnetic disk 1, being in the state shown in FIG. 7(*b*). After that, the read and/or write head 3 advances more to the unloading direction 13, the cam follower 51 and the slider 4 connected to it both descend following the edge of cam 7, ending in the state shown in FIG. 7(*c*). The slider 4 rides on the landing plate 8, upon which it is supported. The motion line 14 shows the operation of the slider 4 at this time.

In addition, the loading/unloading operation of the slider 4 is performed during the rotation of the magnetic disk 1.

Next, explanation will be given for another embodiment.

Figure 8:
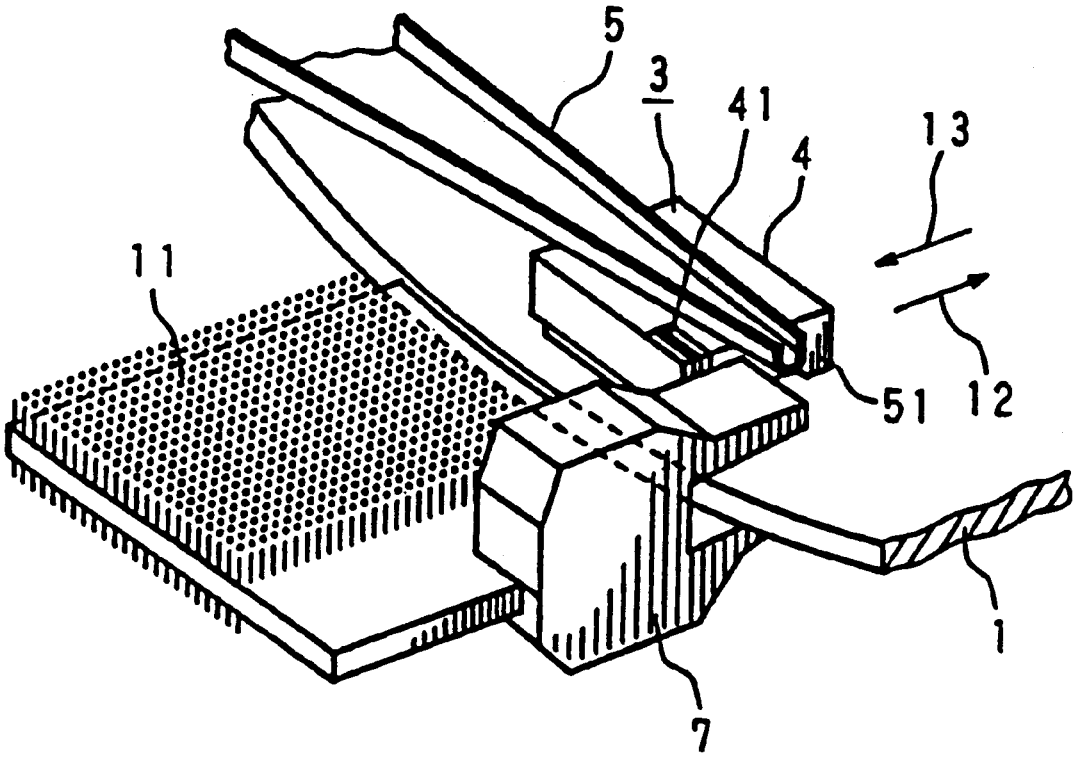
FIG. 8 is a perspective view showing another embodiment of the invention.
Figure 9:
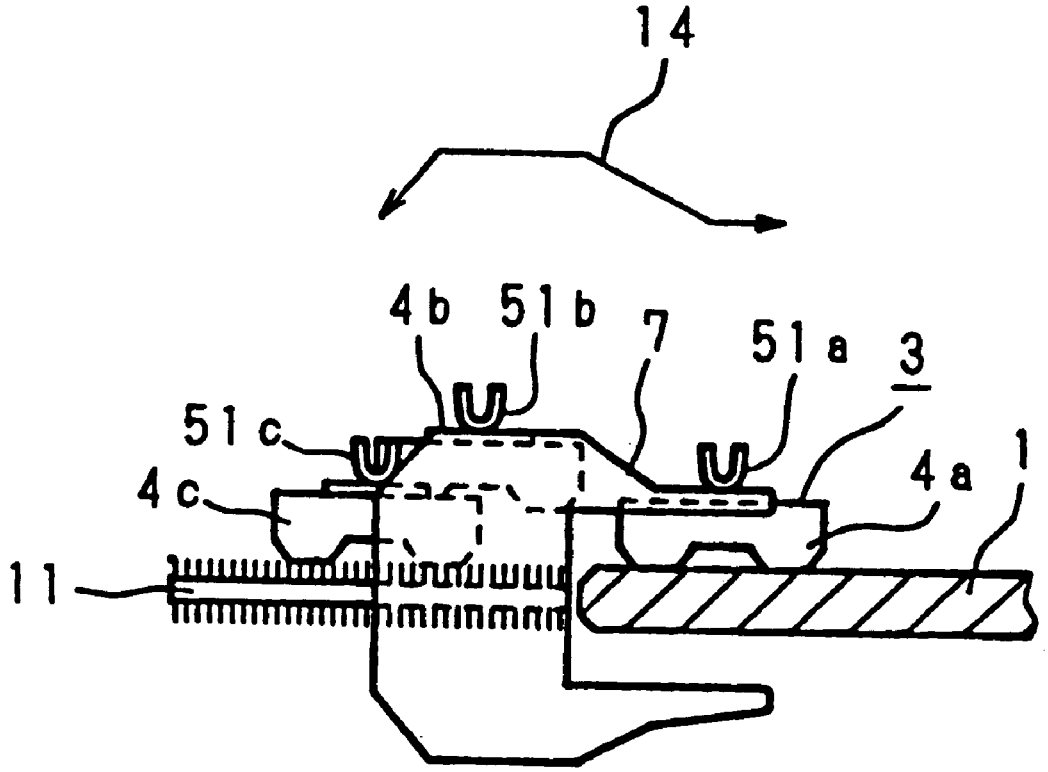
FIG. 9 is a view showing the operation.

Although, in the embodiment mentioned above, a flat board-like plate is shown as the landing plate 8 on which the slider 4 rides at the time of retracting, a brush-like landing plate 11 shown in FIG. 8 and FIG. 9 may also be used. Moreover, although being not shown particularly in the figures, a landing plate on which a nonwoven fabric is sticked may also be used. Or, a landing plate on which a sheet having elasticity such as TEFLON is attached to can be used, too. Moreover, at this time, the slider 4 can be cleansed by making the slider 4 operate to rub the surface of the brush-like landing plate 11 or the landing plate on which the nonwoven fabric is attached to.

In addition, in the two embodiments mentioned above, although the slider 4 is said to load/unload during the rotation of the magnetic disk 1, CSS method can be applied in which the magnetic disk 1 is rotated after the loading/unloading of the slider 4.

As described in the above, according to the invention, as the head retract mechanism of the disk driving apparatus is so combined with the cam and landing plate as to support the slider, the slider does not hang from the spring, thereby high reliability can be obtained even when turbulence from the exterior such as vibration and shock is occurred.

In addition, according to an embodiment wherein an elastic sheet is attached to the landing plate, more positive absorption effect of shock can be obtained.

Moreover, using a brush-like landing plate, more surface contact is made with the slider than by using an elastic sheet, thereby supporting the slider better. Thus, this embodiment is more effective in absorbing shock.

Furthermore, there is an effect on lengthening the life of the disk driving apparatus by making the slider operate to cleanse itself on the landing plate on which the nonwoven fabric is sticked or on the brush-like landing plate.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bound thereof are therefore intended to be embraced by the claims.

What is claimed is:

[1. A read/write head retract apparatus for use with a recording disk, the apparatus comprising:

a read and/or write head;

a spring for supporting said read and/or write head and for urging said read and/or write head toward said recording disk;

an actuator to move said spring and in turn said read and/or write head in a substantially radial direction of said recording disk during unloading or loading of said head;

a cam guiding said spring and said read and/or write head away from said recording disk during unloading of said read and/or write head by said actuator; and a platform having a surface upon which said read and/or write head directly rests after having moved away from said recording disk during unloading.]

[2. A read/write head retract apparatus as set forth in claim 1, wherein said recording disk has magnetic recording surfaces disposed on both sides thereof.]

[3. A read/write retract apparatus as set forth in claim 2, wherein said read and/or write head is a magnetic head having a slider which rises according to rotation of said recording disk.]

[4. A read/write head retract apparatus as set forth in claim 1, wherein said cam is provided along the radial direction of said recording disk, and has two tapered surfaces and a flat surface which connects the two tapered surfaces.]

[5. A read/write head retract apparatus as set forth in claim 1, wherein said cam includes a cam surface disposed at an outer periphery of said disk and extending in a radial direction along said recording disk.]

6. A read/write head retract apparatus [as set forth in claim 5,] *for use with a recording disk, the apparatus comprising:*

*a read and/or write head;*

*a spring for supporting said read and/or write head and for urging said read and/or write head toward said recording disk;*

*an actuator to move said spring and in turn said read and/or write head in a substantially radial direction of said recording disk during unloading or loading of said head;*

*a cam guiding said spring and said read and/or write head away from said recording disk during unloading of said read and/or write head by said actuator, said cam including a cam surface disclosed at an outer periphery of said disk and extending in a radial direction along said recording disk; and*

*a platform having a surface upon which said read and/or write head directly rests after having moved away from said recording disk during unloading,* wherein said cam surface comprises two tapered surfaces and a flat surface which interconnects the two tapered surfaces, *and*

*wherein one of said tapered surfaces leads to said platform.*

[7. A read/write head retract apparatus as set forth in claim 6, wherein one of said tapered surfaces leads to said platform.]

[8. A read/write head retract apparatus as set forth in claim 1, wherein said cam comprises a pair of cam surfaces each extending in a radial direction of said recording disk and disposed at respective magnetic recording surfaces on opposed sides of said disk.]

9. A read/write head retract apparatus [as set forth in claim 5,] *for use with a recording disk, the apparatus comprising:*

*a read and/or write head;*

*a spring for supporting said read and/or write head and for urging said read and/or write head toward said recording disk;*

*an actuator to move said spring and in turn said read and/or write head in a substantially radial direction of said recording disk during unloading or loading of said head;*

*a cam guiding said spring and said read and/or write head away from said recording disk during unloading of said read and/or write head by said actuator, said cam comprising a pair of cam surfaces each extending in a radial direction of said recording disk and disposed at respective magnetic recording surfaces on opposed sides of said disk; and*

*a platform having a surface upon which said read and/or write head directly rests after having moved away from said recording disk during unloading,* wherein each cam surface comprises two tapered surfaces and a flat surface which interconnects the two tapered surfaces, *and*

*wherein one of said tapered surfaces leads to said platform.*

[10. A read/write head retract apparatus as set forth in claim 9, wherein one of said tapered surfaces leads to said platform means.]

[11. A read/write head retract apparatus as set forth in claim 1, wherein said spring has a cam follower thereon which rests directly on said cam.]

[12. A read/write head retract apparatus as set forth in claim 11, wherein said cam follower is located at an outward end of said spring and wherein said head is located inwardly from said outward end.]

[13. A read/write head retract apparatus for use with a recording disk, the apparatus comprising:

a read and/or write head;

a spring for supporting said read and/or write head and for urging said read and/or write head toward said recording disk;

an actuator to move said spring and in turn said read and/or write head in a substantially radial direction of said recording disk during unloading or loading of said head;

a cam guiding said spring and said read and/or write head away from said recording disk during unloading of said read and/or write head by said actuator; and a platform having a surface upon which said read and/or write head directly rests after having moved away from said recording disk during unloading, wherein said platform surface includes a flat board-like landing plate upon which said read and/or write head directly rests.]

[14. A read/write head retract apparatus for use with a recording disk, the apparatus comprising:

a read and/or write head;

a spring for supporting said read and/or write head and for urging said read and/or write head toward said recording disk;

an actuator to move said spring and in turn said read and/or write head in a substantially radial direction of said recording disk during unloading or loading of said head;

a cam guiding said spring and said read and/or write head away from said recording disk during unloading of said read and/or write head by said actuator; and a platform having a surface upon which said read and/or write head directly rests after having moved away from said recording disk during unloading, wherein said platform surface includes a brush-like landing plate upon which said read and/or write head directly rests.]

* * * * *

UNITED STATES PATENT AND TRADEMARK OFFICE

CERTIFICATE OF CORRECTION

PATENT NO. : Re. 36,672

DATED : April 25, 2000

INVENTOR(S) : ONOOKA, Yasushi, et al

It is certified that error appears in the above-identified patent and that said Letters Patent is hereby corrected as shown below:

On the title page, item [75] Inventors: delete "Tetsu Yamamoto"

Column 5, line 62, delete "disclosed" and insert --disposed--.

Signed and Sealed this

Ninth Day of January, 2001

*Attest:*

Q. TODD DICKINSON

*Attesting Officer*

*Commissioner of Patents and Trademarks*